Feb. 7, 1956

C. E. SULLIVAN 2,733,771

HYDRAULIC BOOSTER DRIVE FOR MOTOR VEHICLES

Filed July 15, 1952

Clifford E. Sullivan
INVENTOR

BY Frank B. Wooden
ATTORNEY.

Feb. 7, 1956  C. E. SULLIVAN  2,733,771
HYDRAULIC BOOSTER DRIVE FOR MOTOR VEHICLES
Filed July 15, 1952  3 Sheets-Sheet 3

Clifford E. Sullivan
INVENTOR
BY Frank B. Wooden
ATTORNEY.

United States Patent Office 2,733,771
Patented Feb. 7, 1956

2,733,771

HYDRAULIC BOOSTER DRIVE FOR MOTOR VEHICLES

Clifford E. Sullivan, Baltimore County, Md.

Application July 15, 1952, Serial No. 298,921

2 Claims. (Cl. 180—66)

This invention relates to motor vehicle construction and particularly to the development of a self-contained motor unit of heavy duty type.

It has for one of its objects, the provision of a device in which power is developed in close proximity to the point of application, thus reducing the losses sustained in devices in which power is developed at a point relatively distant from its application.

Another object is the provision of mechanism whereby power is applied to each one of the traction wheels independently but simultaneously.

Another object of the invention is the provision of a device in which free wheeling is established immediately upon cessation of power application.

With these and other objects in view the device consists in the arrangement and combination of parts hereinafter described and claimed, it being understood that changes may be made within the scope of what is claimed, without departing from the spirit of the invention or sacrificing any of the advantages thereof.

Figure 1:
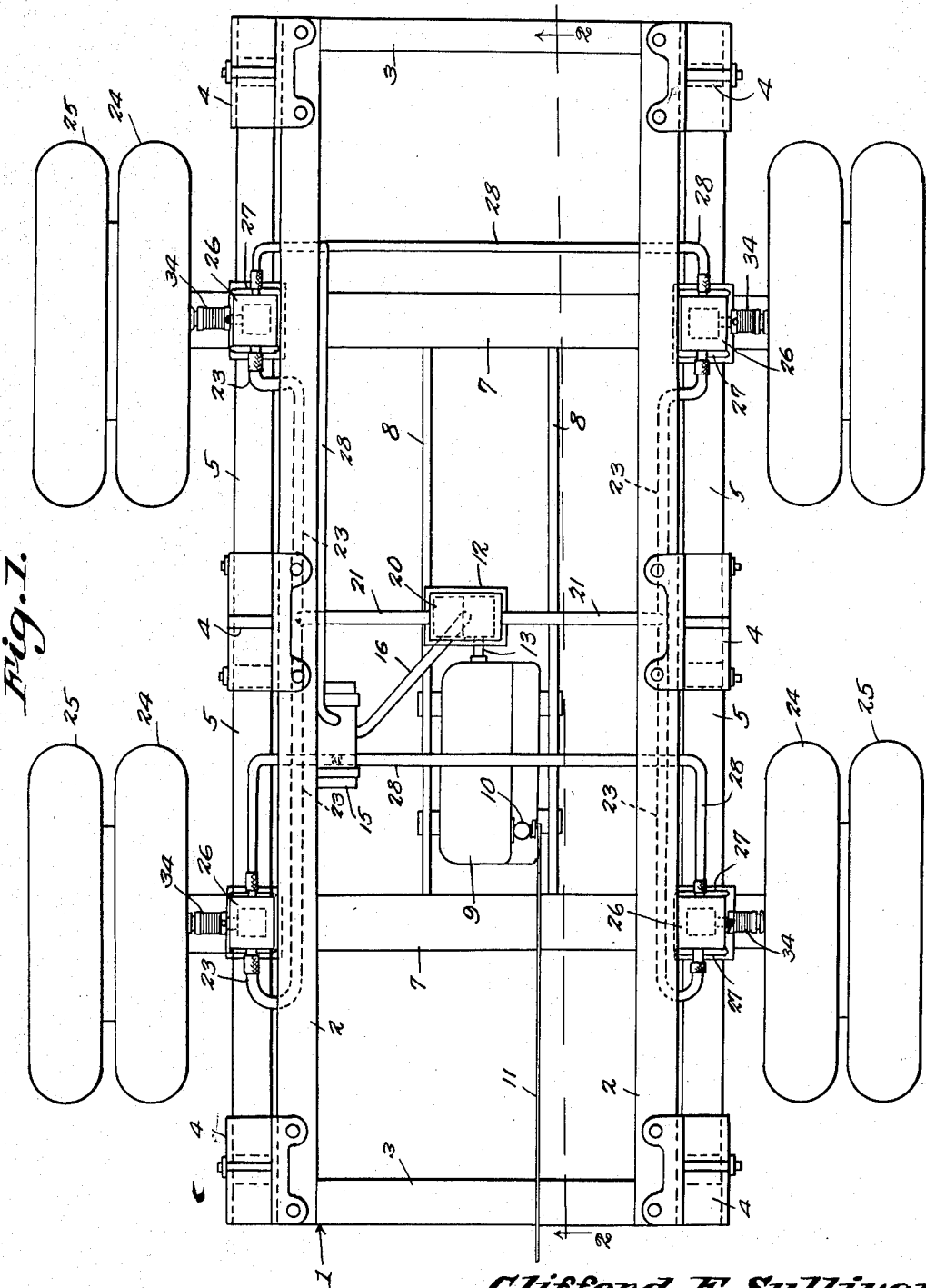
Fig. 1 is a top plan view of the device certain concealed portions thereof being indicated in dotted lines.
Figure 2:
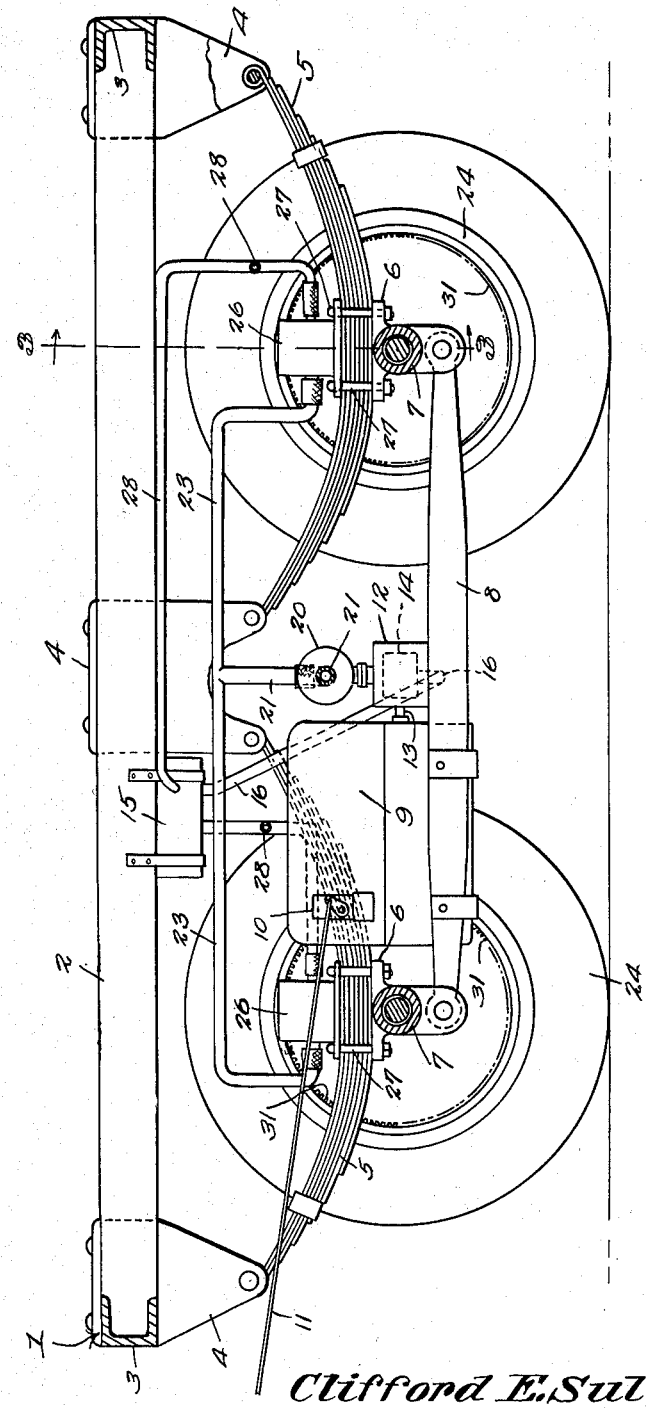
Fig. 2 is a longitudinal sectional view, the same being taken substantially on line 2—2 of Fig. 1.
Figure 3:
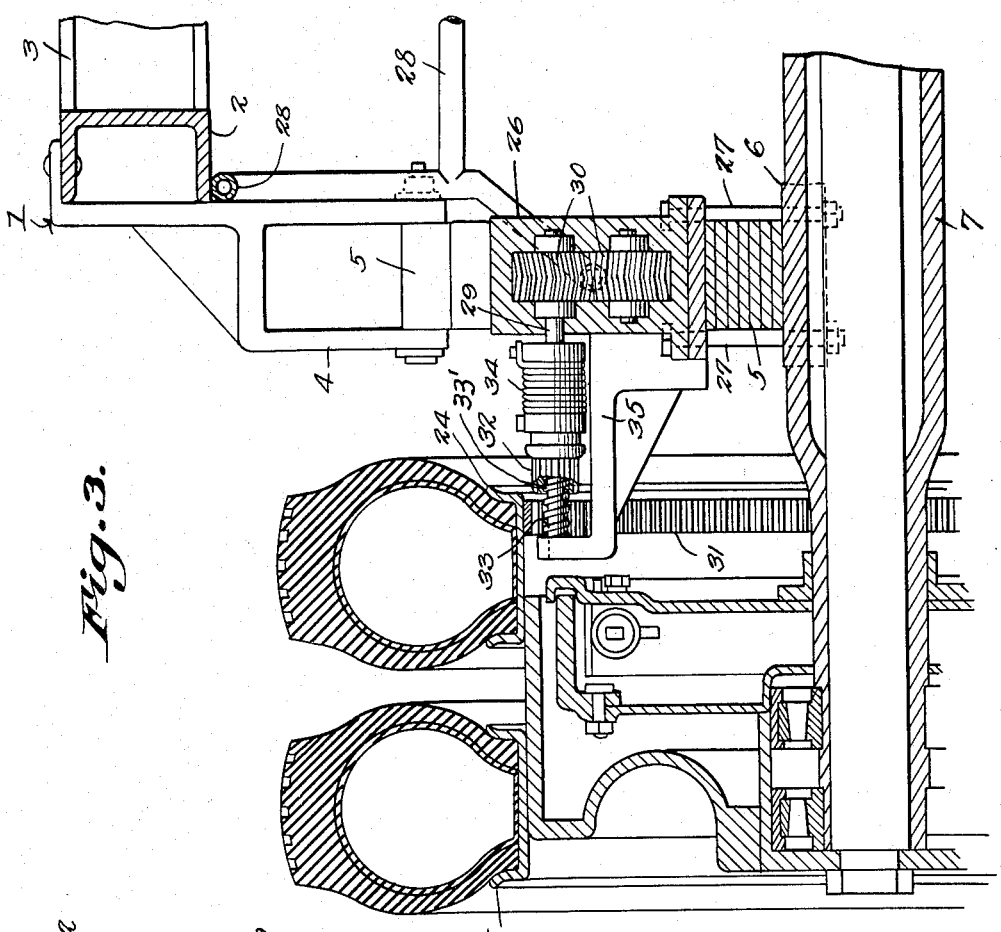
Fig. 3 is an enlarged sectional view substantially on line 3—3 of Fig. 2.

Referring to the drawings by characters of reference, numeral 1 designates generally the chassis of the device, comprising side rails 2 connected by cross bars 3. Hangers 4 attached to the rails 2 provide shackles for the springs 5, the springs resting on saddles 6 attached to the axles 7. Reach bars 8 are connected to the axles and provide support for an internal combustion engine 9. A carburetter 10 for the engine is controlled from the cab of the vehicle through a connection 11.

In the present drawing a four wheeled unit has been depicted as having connection with the prime power source. A greater or lesser number of wheels may be connected for power application in precisely the same manner as herein shown and described.

Figure 4:
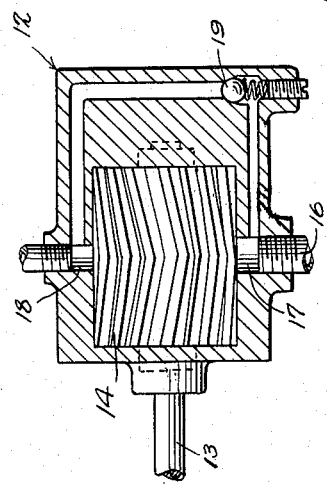
Fig. 4 is a fragmentary sectional view of the prime hydraulic motor or pump.

As shown in the drawing and in detail in Fig. 4, a hydraulic power pump 12 has capacity to deliver ample driving power to all of the wheels of the unit. The pump 12 is of the well known gear type pump and is shown as having herringbone formed teeth, this showing however not being mandatory, it being understood that any preferred type of pump may be used. The engine shaft 13 may be connected to or form a part of one of the pump gears 14.

Fluid from a supply tank 15 is delivered through a pipe 16 to the intake port 17 of the pump 12. An outlet port 18 is in communication with a relief valve 19 whereby in case excessive pressure occurs in the line beyond the port 18 the valve 19 will open to prevent damage to the mechanism.

Connected to the port 18 is a manifold 20, from which pipes or tubes 21 lead to opposite sides of the frame. These conduits 21 are connected to feed pipes 23 having connections to the hydraulic motors located at each wheel of the trailer unit.

Since the structure to be described hereinafter refers to the driving mechanism at each wheel, it is thought a detailed description of one wheel unit will suffice for all.

Dual wheels 24 and 25 are shown, single wheels instead of dual wheels might be employed without change in the structure herein shown. In either case a hydraulic motor 26 is secured in place over the spring 5 and saddle 6 by means of clips 27.

The motor 26 is similar in all respects to the hydraulic motor 12 less the relief valve 19. Fluid under pressure is delivered to the motor 26 through the pipe 23 and exhausts back to the reservoir 15 through the pipe 28.

A shaft 29 extends from one of the gears 30 of the motor 26 and forms a part of the driving mechanism between the motor 26 and the traction wheels 24 and 25. An internal gear rack 31 is secured to the rim of the wheel 24. It may here be pointed out that with power applied to the shaft 29 rotation thereof will feed the sleeve and worm gear 32 forwardly due to the inertia of the sleeve and worm gear 32 toward the gear 31, meshing the gear 32 with driving engagement with gear 31. As the driving force is applied to the gear 32 though the shaft 29 is greater than the resistance of the traction wheels against turning there will be no disengagement of the gear by the nut feeding back on the worm. The nut will feed back on the shaft only when the driving force is reduced by decreasing the power applied to the shaft 29, and the consequent inertia thereof, which will permit the effective application of force by means of spring 34. The rack 31 is located in a position to be engaged by a pinion gear 32 mounted for longitudinal movement on a shaft 29. A long pitch thread 33 formed on the shaft 29 is in mesh with internal threads 33' in the gear 32, thus, upon initial rotation of the shaft 29, the gear 32 will be advanced by rotation of the worm 33 acting on the threads of the gear 32 against the inertia of said gear along the worm 33 into mesh with the rack 31 thereby driving the traction wheels 24 and 25. Upon removal of pressure from the motor 26, retraction of the gear 32 from driving position is effected by the spring 34, upon the reduction of the inertia drive. The structure herein described including the parts 32, 33, and 34 are similar in construction and operation to the well known Bendix motor starting device. A bracket 35 supports the outer end of the shaft 29. Longitudinal movement of the gear 32 along the worm 33 is checked when the gear 32 contacts the bracket 35 whereupon the gear 32 and worm 33 rotate as a unit under the application of torque applied by the shaft 29. Since the rack 31 is already in motion, engagement of the gear 32 therewith will be readily accomplished. The torque resistance of the driving wheels will be effectively reduced upon full engagement of the worm gear 32, and since wheels and gear 31 are rotating in the same direction no effective disengagement will result upon the increase of such torque resistance.

In operation, with the engine 9 driving the pump 12, pressure is created in the manifold 20 and conduits 21 and 23 thence to the various motors 26 which in turn through the gears 32 impart motion to the ring gear 31 to drive the wheels. The engine 9 is controlled by the throttle 11 so that any desired speed of the traction wheels may be obtained.

While the device may be used as an auxiliary mover for any vehicle, it is particularly adaptable as a booster drive for trailer trucks in which the tractive power is located at a comparatively distant point from the load carrying truck, with the present structure supplanting the non-powered rear truck the driver of the vehicle equipped with this device is provided with additional driving power on heavy grades, power that may be cut out at the top of the grade and thus permit free wheeling eliminating the drag of any connected gearing.

Furthermore in the construction of this invention a clutch, transmission and differential are entirely eliminated together with their attendant cost and defects.

What is claimed is:

1. A vehicle of the class described comprising a chassis mounted upon traction wheels, an engine on the chassis, a hydraulic pump operatively connected to the engine, a fluid driven motor connected to said pump, a drive shaft extended from the motor, said shaft having a threaded portion at its outer end, a pinion gear on the shaft, the pinion gear having internal threads engaging the threaded end of the shaft providing longitudinal movement of the pinion gear along the threaded shaft when the threaded shaft is rotated, a ring gear secured to the traction wheel, the ring gear and the pinion gear having interengaging elements thereon, whereby driving connection is established between the ring gear and the pinion gear upon longitudinal movement of the pinion gear on the drive shaft, when said shaft is rotated.

2. A vehicle of the class described comprising a chassis mounted upon traction wheels, an engine on the chassis, a hydraulic pump operatively connected to the engine, a fluid driven motor connected to said pump, a drive shaft extending from the motor, said shaft having a threaded end portion, a pinion gear on the shaft, the pinion gear having internal threads engaging the threaded portion of the shaft providing longitudinal movement of the pinion gear along the threaded shaft when the said shaft is rotated, a ring gear secured to the traction wheel, the ring gear and the pinion gear having interengaging elements, whereby driving connection is established between the ring gear and the pinion gear upon longitudinal movement of the pinion gear on the drive shaft when said shaft is rotated and a distributing system for conducting fluid under pressure from the pump to the motor.

References Cited in the file of this patent

UNITED STATES PATENTS

| 939,116 | Whitacre | Nov. 2, 1909 |
| 2,060,612 | Dake | Nov. 10 1936 |
| 2,140,109 | Kellar | Dec. 13, 1938 |
| 2,235,175 | Simpkins et al. | Mar. 18, 1941 |
| 2,536,392 | Randall | Jan. 2, 1951 |

OTHER REFERENCES

Dyke's Automobile and Gasoline Encyclopedia, 20th edition, published 1943 by The Goodheart-Wilcox Co., Inc., Chicago, Illinois, pages 319, 320, 321. (Copy in Div. 47.)